(12) United States Patent
Kaciulis

(10) Patent No.: US 12,177,196 B2
(45) Date of Patent: Dec. 24, 2024

(54) DISTRIBUTED TRUST-BASED COMMUNICATION

(71) Applicant: Netflow, UAB, Vilnius (LT)

(72) Inventor: Karolis Kaciulis, Kaisiadorys (LT)

(73) Assignee: Netflow, UAB, Vilnius (LT)

( * ) Notice: Subject to any disclaimer, the term of this patent is extended or adjusted under 35 U.S.C. 154(b) by 482 days.

(21) Appl. No.: 17/546,931

(22) Filed: Dec. 9, 2021

(65) Prior Publication Data

US 2023/0188510 A1    Jun. 15, 2023

(51) Int. Cl.
*H04L 9/40* (2022.01)
*H04L 9/06* (2006.01)
*H04L 9/08* (2006.01)
*H04L 9/30* (2006.01)

(52) U.S. Cl.
CPC ........ *H04L 63/0442* (2013.01); *H04L 9/0631* (2013.01); *H04L 9/0841* (2013.01); *H04L 9/302* (2013.01); *H04L 9/3066* (2013.01); *H04L 63/0272* (2013.01); *H04L 63/0428* (2013.01); *H04L 63/123* (2013.01)

(58) Field of Classification Search
CPC . H04L 63/0442; H04L 9/0631; H04L 9/0841; H04L 9/302; H04L 9/3066; H04L 63/0272; H04L 63/0428; H04L 63/123; H04L 9/40
See application file for complete search history.

(56) References Cited

U.S. PATENT DOCUMENTS

| | | | |
|---|---|---|---|
| 4,200,770 A | 4/1980 | Hellman et al. | |
| 6,266,704 B1 | 7/2001 | Reed et al. | |
| 9,118,632 B1 | 8/2015 | Chuang et al. | |
| 9,246,876 B1 * | 1/2016 | Melam | H04L 67/14 |
| 9,306,913 B1 | 4/2016 | Volkov | |
| 9,525,665 B1 | 12/2016 | Evans et al. | |
| 10,225,265 B1 | 3/2019 | Sankuratripati | |
| 10,693,634 B2 | 6/2020 | An et al. | |
| 10,904,000 B2 | 1/2021 | Gray | |
| 11,088,996 B1 | 8/2021 | Spector et al. | |
| 2002/0077986 A1 | 6/2002 | Kobata et al. | |
| 2002/0161925 A1 | 10/2002 | Munger et al. | |
| 2003/0046533 A1 | 3/2003 | Olkin et al. | |
| 2003/0182443 A1 | 9/2003 | Wang et al. | |

(Continued)

OTHER PUBLICATIONS

Phonelife, Tip of the Day, How to FaceTime with an Android User or Windows User on iPhone (New to iOS 15), https://mailer.iphonelife.com/ga/webviews/4-1909145-5-8042-10004-53982-s688fd77f8, Nov. 10, 2021, 10 pages.
What is Double VPN and when should you use it?, Mindaugas Jancis, https://cybernews.com/what-is-vpn/what-is-double-vpn/, Sep. 2, 2021, 10 pages.
What is Double VPN and Should I Use It?, https://www.vpnmentor.com/blog/what-is-double-vpn-and-should-i-us-it/, Oct. 22, 2021, 7 pages.

(Continued)

*Primary Examiner* — Izunna Okeke
(74) *Attorney, Agent, or Firm* — Young Basile Hanlon & MacFarlane, P.C.

(57) ABSTRACT

A computer generates a first encrypted message by encrypting an unencrypted message for decryption at a receiving device. The computer couples the first encrypted message with addressing data associated with the receiving device to generate a coupled message. The computer generates a second encrypted message by encrypting the coupled message for decryption at a data transmission service. The computer transmits the second encrypted message via the data transmission service to enable the receiving device to read the unencrypted message.

16 Claims, 9 Drawing Sheets

(56) References Cited

U.S. PATENT DOCUMENTS

| | | |
|---|---|---|
| 2003/0235308 A1 | 12/2003 | Boynton et al. |
| 2004/0025057 A1 | 2/2004 | Cook |
| 2004/0210772 A1 | 10/2004 | Hooker et al. |
| 2006/0010324 A1 | 1/2006 | Appenzeller et al. |
| 2007/0271360 A1 | 11/2007 | Sahita et al. |
| 2008/0072033 A1 | 3/2008 | McAlister |
| 2009/0220080 A1 | 9/2009 | Herne et al. |
| 2011/0055894 A1 | 3/2011 | Chao et al. |
| 2012/0166582 A1 | 6/2012 | Binder |
| 2012/0317655 A1 | 12/2012 | Zhang et al. |
| 2014/0068262 A1 | 3/2014 | Robertson et al. |
| 2016/0294794 A1 | 10/2016 | Mancic et al. |
| 2016/0371508 A1 | 12/2016 | Mccorkendale et al. |
| 2017/0155628 A1 | 6/2017 | Rohloff et al. |
| 2019/0014094 A1 | 1/2019 | Le Saint |
| 2019/0028440 A1 | 1/2019 | Eriksson et al. |
| 2019/0081930 A1 | 3/2019 | Hunt, IV |
| 2019/0132292 A1 | 5/2019 | Reimer |
| 2019/0163912 A1 | 5/2019 | Kumar et al. |
| 2019/0372936 A1* | 12/2019 | Sullenberger ......... H04L 63/164 |
| 2020/0143922 A1 | 5/2020 | Chekroud et al. |
| 2020/0252379 A1 | 8/2020 | Lew |
| 2021/0067495 A1 | 3/2021 | Yuting et al. |
| 2021/0314359 A1 | 10/2021 | Thyagaturu et al. |
| 2022/0150220 A1 | 5/2022 | Verheyen |

OTHER PUBLICATIONS

Trivedi, T., Parihar, V., Khatua, M., Mehtre, B.M. (2019). Threat Intelligence Analysis of Onion Websites Using Sublinks and Keywords. In: Abraham, A., Dutta, P., Mandal, J., Bhattacharya, A., Dutta, S. eds Emerging Technologies in Data Mining and Information Security, https://doi.org/10.1007/978-981 (Year: 2018).

Kaur, S. & Randhawa, S. (2020) Dark Web: A Web of Crimes. Wireless personal communications. [Online] 112 (4), 2131-2158. (Year: 2020).

J. P. Podolanko, R. Pobala, H. Mucklai, G. Danezis and M. Wright, "LiLAC: Lightweight Low-Latency Anonymous Chat," 2017 IEEE Symposium on Privacy-Aware Computing (PAC), Washington, DC, USA, 2017, pp. 141-151, doi: 10.1109/PAC.2017.14. (Year: 2017).

Huete Trujillo, Diana L., and Antonio Ruiz-Martinez. "Tor hidden services: A systematic literature review." Journal of Cybersecurity and Privacy 1.3 (2021): 496-518. (Year: 2021).

Wang et al., "Design of An Instant Messaging System Using Identity Based Cryptosystems", Sep. 2013, Fourth International Conference on Emerging Intelligent Data and Web Technologies, pp. 277-281 (Year: 2013).

Ankit, "Lilac: Architecture for Anonymous Light Weight Communication." ProQuest Dissertations & Theses, 2013.

* cited by examiner

DISTRIBUTED TRUST-BASED COMMUNICATION

BACKGROUND

In recent decades, the use of network-based communications has increased exponentially. In some implementations of network-based communications messages are transmitted from a first device to second device over a network. However, messages transmitted over the network may be read by an eavesdropper device or improperly modified by a malicious actor device during the transmission.

SUMMARY

Disclosed herein are implementations of distributed trust-based communication over a network.

An aspect of the disclosure is a method for distributed trust-based message transmission. Distributed trust-based message transmission comprises generating a first encrypted message by encrypting an unencrypted message for decryption at a receiving device, coupling the first encrypted message with addressing data associated with the receiving device to generate a coupled message, generating a second encrypted message by encrypting the coupled message for decryption at a data transmission service, and transmitting the second encrypted message via the data transmission service to enable the receiving device to read the unencrypted message.

An aspect of the disclosure is a system including processing circuitry and memory. The memory stores instructions which, when executed by the processing circuitry, cause the processing circuitry to perform distributed trust-based message transmission. Distributed trust-based message transmission comprises generating a first encrypted message by encrypting an unencrypted message for decryption at a receiving device, coupling the first encrypted message with addressing data associated with the receiving device to generate a coupled message, generating a second encrypted message by encrypting the coupled message for decryption at a data transmission service, and transmitting the second encrypted message via the data transmission service to enable the receiving device to read the unencrypted message.

An aspect of the disclosure is a machine-readable medium storing instructions which, when executed by a machine, cause the machine to perform distributed trust-based message transmission. Distributed trust-based message transmission comprises generating a first encrypted message by encrypting an unencrypted message for decryption at a receiving device, coupling the first encrypted message with addressing data associated with the receiving device to generate a coupled message, generating a second encrypted message by encrypting the coupled message for decryption at a data transmission service, and transmitting the second encrypted message via the data transmission service to enable the receiving device to read the unencrypted message.

In some implementations, generating the first encrypted message by encrypting the unencrypted message comprises encrypting the unencrypted message with a public key or the public data of the receiving device.

In some implementations, generating the second encrypted message by encrypting the coupled message comprises encrypting the coupled message with a public key of the data transmission service.

In some implementations, transmitting the second encrypted message via the data transmission service causes the data transmission service to perform operations comprising decrypting the second encrypted message to access the coupled message, and forwarding the first encrypted message, included in the coupled message, to the receiving device.

In some implementations, forwarding the first encrypted message to the receiving device causes the receiving device to perform operations comprising decrypting the first encrypted message to read the unencrypted message.

In some implementations, the receiving device is a web server and the data transmission service is a web infrastructure service.

In some implementations, the first encrypted message and the second encrypted message are generated at a sending device, and the first encrypted message and the second encrypted message are encrypted with a private key or the public data of the sending device.

In some implementations, the addressing data associated with the receiving device comprises an Internet Protocol (IP) address or data associated with the IP address.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
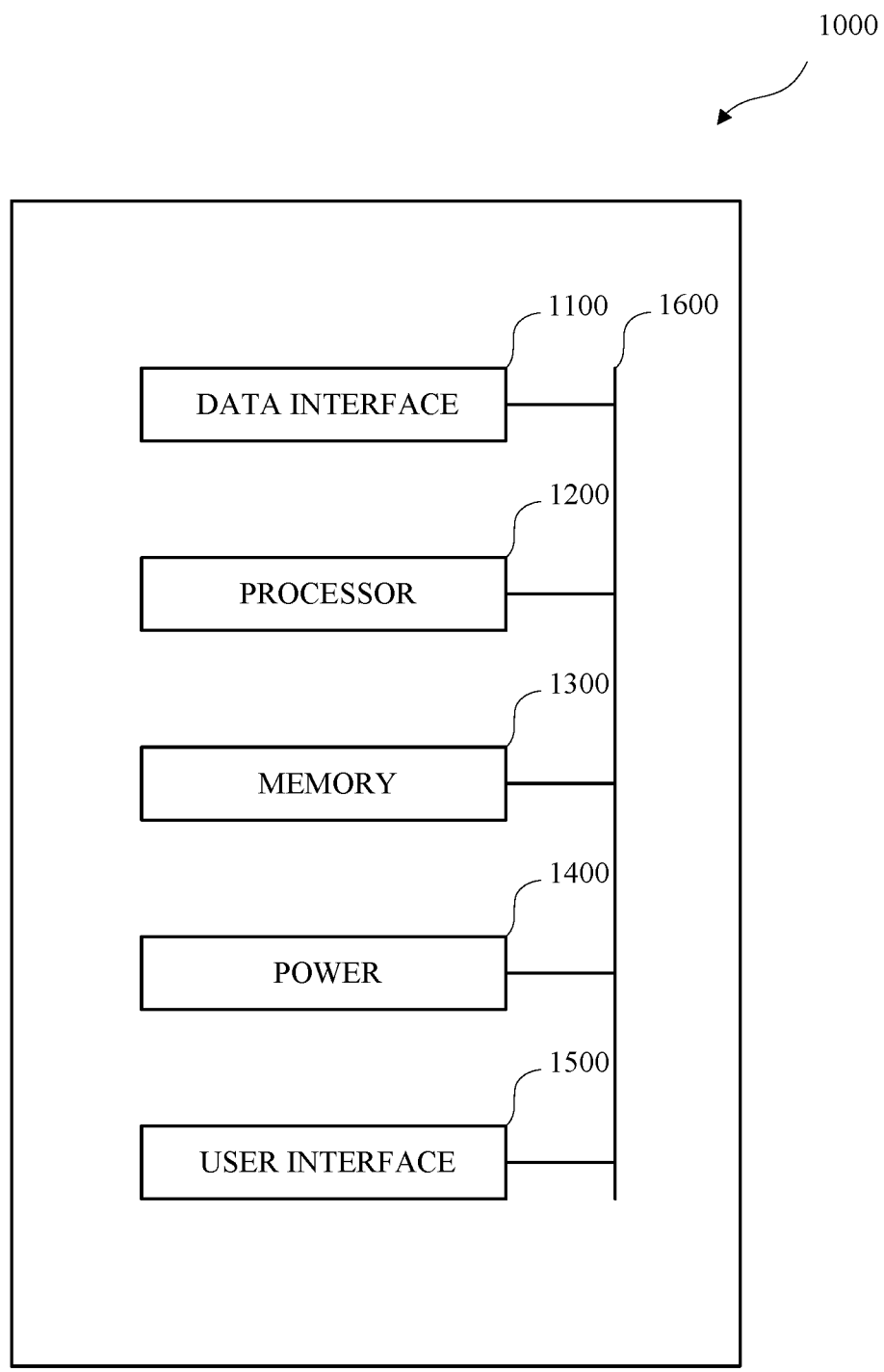
FIG. 1 is a block diagram of an example of a computing device.

A message transmitted using a data transmission service, such as a network or a direct wired or wireless connection, may be intercepted, read, modified, or otherwise improperly accessed by an eavesdropper device or a malicious actor device. For example, data transmitted from a server to a client device may be intercepted by a malicious actor device, malicious code may be added to the transmission by the malicious actor device, the client device may receive the transmission including the malicious code, and the client device may execute the malicious code, causing damage to the client device.

To increase privacy, or security, of transmitted, received, or both, messages, a computing device may access the Internet via a virtual private network (VPN). In a VPN implementation, a client device transmits data to a VPN server, and the VPN server transmits the data over the Internet, for example, to a web server associated with a website the computing device is accessing. A web server identifies a source of the received data as the VPN server and may lack the Internet Protocol address (or other networking protocol address) of the client device.

The computing device may use a messaging application that implements end-to-end encryption to communicate with another device. A computing device using a VPN to access other networks, such as the Internet, may, in some cases, share data transmitted or received over the other networks with a provider of the VPN. The provider of the VPN may protect the data transmitted by the computing device from eavesdropper devices or malicious actor devices. The end-to-end encryption implemented by some messaging services, which may reduce or eliminate the risk of improper access to the content of communications exchanged using the messaging service, may be unavailable when communicating with devices that do not use the respective messaging service. For example, if client device A uses messaging service B, client device A cannot use messaging service B to communicate with client device C that uses messaging service D.

A data transmission service includes hardware, software, or a combination thereof, used to transmit data from one computing device to another computing device. A data transmission service may include at least one of a network, a web infrastructure, a wired connection, a wireless connection, or the like.

End-to-end encryption may include technology that ensures that a message can only be read by a sending device and a receiving device, and not by any intermediary devices, such as a network server. For example, if a messaging application server implements end-to-end encryption, client devices communicating using the network server can read the messages that the client devices exchange. However, the network server is unable to read the messages.

Some implementations of distributed trust-based messaging described herein improve the security of electronic communications relative to other messaging schemes. In some implementations, a sending device, such as a client device, generates a first encrypted message by encrypting a unencrypted message for decryption at a receiving device, such as a web server. For example, encryption may include representing the message as a number and applying an operation to the number, such that the inverse of the operation is only known to the device that is to receive the message. An example encryption technique is described in conjunction with FIG. 3. The sending device couples or creates a data structure combining the first encrypted message with addressing data associated with the receiving device to generate a coupled message. The sending device generates a second encrypted message by encrypting the coupled message that is capable of being decrypted at a data transmission service, such as an Internet service provider (ISP), or a VPN. The sending device transmits the second encrypted message via the data transmission service. The data transmission service decrypts the second encrypted message to access the coupled message. The data transmission service forwards the first encrypted message, from within the coupled message, to the receiving device. The receiving device decrypts the first encrypted message to access the unencrypted message.

Some implementations of distributed trust-based message transmission relate to distributed trust-based message transmission over multiple VPNs. A client device generates a first encrypted message by encrypting, for example as described in conjunction with FIG. 3, an input message for transmission by a first VPN. The client device couples the first encrypted message with addressing data associated with the first VPN (the addressee is the first VPN) to generate a coupled message. The client device generates a second encrypted message by encrypting, for example as described in conjunction with FIG. 3, the coupled message for decryption by a second VPN. The client device transmits the second encrypted message via the second VPN. The second VPN then transmits, to the first VPN, the first encrypted message from the second encrypted message. The first VPN transmits the input message from the first encrypted message to a destination machine, such as a web server.

Some implementations of distributed trust-based message transmission relate to distributed trust-based message transmission over multiple messaging services, for example, from a sender device on messenger application ABC to a receiver device having user identifier ALPHA on messenger application DEF. The sender device encrypts, for example as described in conjunction with FIG. 3, an unencrypted message capable of being decrypted at a receiver device to generate a receiver-decryptable message. The sender device couples the receiver-decryptable message with first addressing data, for example, user identifier ALPHA, associated with the receiver device to generate a first coupled message. The sender device generates a first encrypted message by encrypting, for example as described in conjunction with FIG. 3, the first coupled message capable of being decrypted at a messaging service of the receiver device, for example, at a server of messenger application DEF. The sender device couples the first encrypted messaging with second addressing data associated with the messaging service of the receiver device to generate a second coupled message. The sender device generates a second encrypted message by encrypting, for example as described in conjunction with FIG. 3, the second coupled message capable of being decrypted at a messaging service of a sender device, for example, at a server of messenger application ABC. The sender device transmits the second encrypted message via the messaging service of the sender device. The messaging service of the sender device transmits the first encrypted message via the messaging service of the receiver device. The messaging server of the receiver device transmits the receiver-decryptable message to the receiver device. The receiver device accesses the unencrypted message from the receiver-decryptable message.

The term "unencrypted" includes a message, for example a packet or content of the packet, that is not encrypted (e.g., plaintext) and is readable by a computing machine without using decryption technology. Encryption may include transforming an unencrypted message into an encrypted message. Turning the encrypted message back into the unencrypted message may be difficult to prevent or reduce the likelihood of reading of the unencrypted message by eavesdropper machines. However, the recipient device might store, in memory of the recipient device, data that allows the recipient device to decrypt the encrypted message back into an unencrypted format.

The term "couple" may include associating two items in a data structure. For example, a message is coupled with a destination address if a data structure, such as a packet or multiple packets, is created that includes the message and the destination address.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as a personal computer (PC), a server, a workstation, a minicomputer, or a mainframe computer. In some implementations, the computing device 1000 is a mobile device, such as a mobile telephone, a personal digital assistant (PDA), a laptop, or a tablet computer.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC), a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communication links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration data, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, data, such as to an operator of the computing device 1000, such as a human user.

The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
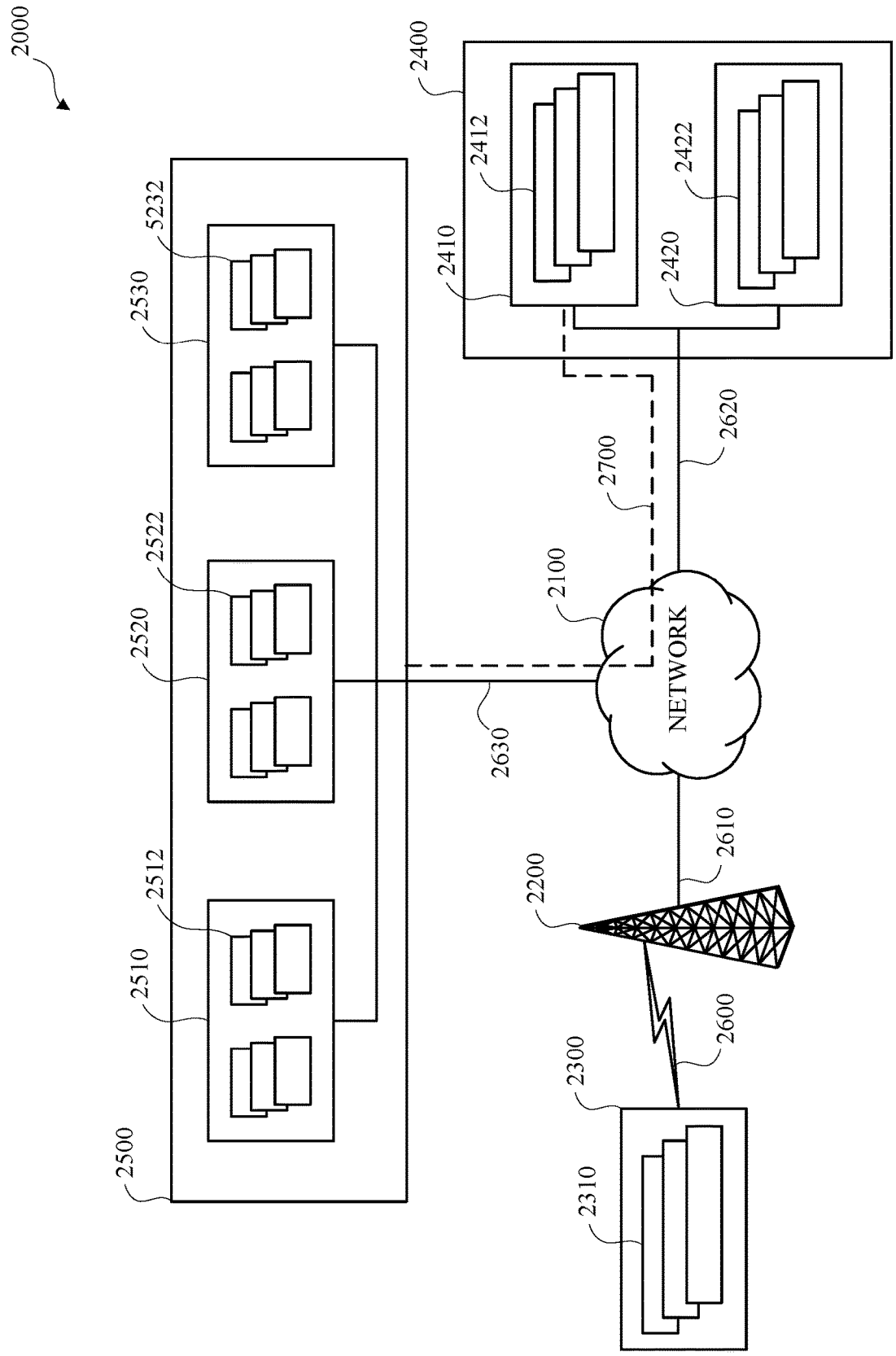
FIG. 2 is a block diagram of an example of a computing and communications system.

FIG. 2 is a diagram of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2530 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communication links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2530, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network (VPN). For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 1620, and the third communications link 1630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2530 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2530 may, respectively, be virtual devices operating on shared physical resources.

A tunnel includes software or hardware for transporting data across a network using protocols that are not supported by that network. Tunneling works by encapsulating packetswrapping packets inside of other packets. A packet is a block of data transmitted over a network.

A VPN is a network security service that allows users to access the Internet or another public network as though they were connected to a private network, rather than the public network. The VPN encrypts Internet communications and provides a degree of anonymity. VPN(s) may be used to protect against snooping on public Wi-Fi® networks, to circumvent Internet censorship, or to connect to a business' internal network for the purpose of remote work.

Typically, to access network(s) (e.g., the Internet), a client device uses an Internet Service Provider (ISP) to provide access to the network(s). The ISP may include a cellular provider, a cable provider, a wired telephone provider, and/or the like. The ISP may provide software or hardware to facilitate access to the network(s) by the client device.

In some implementations, traffic over the network(s) is unencrypted and public. When a client device accesses a network connection, such as by visiting a website in a browser, the client device connects to the ISP, and then the ISP connects to the network(s) to find the appropriate web server to fetch the requested website.

Data about the user of the client device may be exposed in every operation of the website request. Since the IP address of the client device is exposed throughout the process, the ISP and any other intermediary can keep logs of the user's browsing habits. Additionally, the data flowing between the user's device and the web server may be unencrypted. This creates opportunities for malicious actors to spy on the data or perpetrate attacks on the user.

Conversely, a user connecting to the Internet using a VPN service may have a higher level of security and privacy.

A VPN connection may include the following operations. A client device first connects to the ISP using an encrypted connection. The ISP connects the client device to the VPN server, maintaining the encrypted connection. The VPN server decrypts the data from the client device and then connects to the Internet to access the web server in an unencrypted communication. The VPN server creates an encrypted tunnel connection with the client, known as a "VPN tunnel."

The VPN tunnel between the client device and VPN server passes through the ISP, but since all the data is encrypted, the ISP cannot access the activity of the client device. The VPN server's communications with other networks are unencrypted, but the other servers connected to the other networks only log the IP address of the VPN server, which does not give the other servers data about the user.

As set forth above, in some VPN implementations, the VPN server is aware of the identity of the client device and data transmitted by and received from the client device. One downside of these implementations is that the user of the client device is to trust the VPN server.

Figure 3:
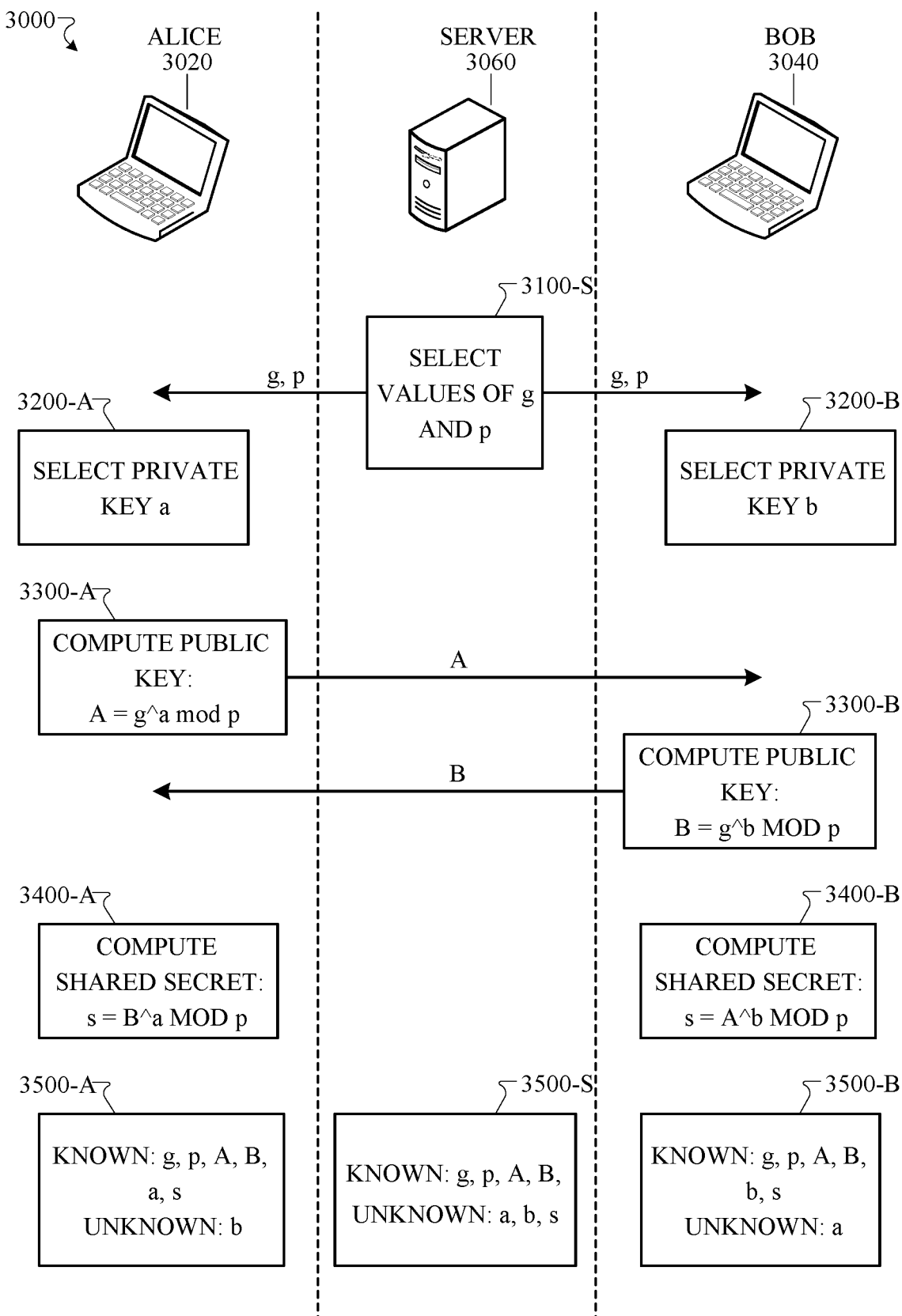
FIG. 3 is a flow diagram of an example of a method of end-to-end encryption and decryption.

FIG. 3 is a flow diagram of an example technique of end-to-end encryption and decryption 3000. As shown, a first computing device 3020 ("Alice") communicates with a second computing device 3040 ("Bob") via a server 3060. The server 3060 is a computing device, such as the computing device 1000 shown in FIG. 1. For simplicity and clarity, the first computing device 3020 is referred to herein as "Alice," and the second computing device 3040 is referred to herein as "Bob." An eavesdropper device, "Eve," may access the server 3060 to view messages transmitted between Alice 3020 and Bob 3040 without the permission of the user of Alice 3020 or the user of Bob 3040. Although Alice 3020 and Bob 3040 are shown as laptop computers, Alice 3020, Bob 3040, or both may, respectively, be another type of computing device, such as a mobile phone, tablet computer, personal digital assistant (PDA), digital music player, or desktop computer. Alice 3020 and Bob 3040 communicate via a server 3060. In an example, the server 3060 is a messaging server, Alice 3020 is a mobile device that includes a first instance of a messaging application, and Bob 3040 is a mobile device that includes a second instance of the messaging application. In another example, Alice 3020 is a device accessing a webpage via a browser, Bob 3040 may be a web server, and the server 3060 may be a web infrastructure service device exchanging, or transporting, data between Alice 3020 and Bob 3040.

The sequence 3000 may be implemented in a situation where Alice 3020 and Bob 3040 initiate communication with one another, for example, when Alice 3020 and Bob 3040 add one another as friends in the messaging service, when Alice 3020 or Bob 3040 first join the messaging service, or when Alice 3020 attempts to access a webpage or web application associated with Bob 3040 for the first time.

At operation 3100-S, the server 3060 identifies communication parameters for encrypted messaging between client devices. The server identifies a large prime number (p) that exceeds a threshold value, such as $10^7$ or $10^9$. The server 3060 identifies a value (g) that is a primitive root modulo p, is less than p, and is greater than 1. In some implementations, g is a prime number.

According to some examples, if a number g is a primitive root modulo p, then every number coprime to p is congruent to a power of g modulo p. That is, in modulo p arithmetic, for every integer a coprime to p, there is an integer k such that $g^k = a$.

The server 3060 notifies Alice 3020 and Bob 3040 of the values of g and p, which may be accessible to the general public and to any devices that use the messaging application associated with the server 3060. In some implementations, the server 3060 may select different values of g and p for different client devices, or the values g and p may be selected at one of the client devices Alice 3020 or Bob 3040.

At operation 3200-A, Alice 3020 selects a private key a. The private key a is an integer greater than 1 and less than p. Alice 3020 may store the private key a in a secure part of local memory and may not share the value of a with any other machine.

Similarly, at operation 3200-B, Bob 3040 selects a private key b. The private key b is an integer greater than 1 and less than p. Bob 3040 may store the private key b in a secure part of local memory and may not share the value of b with any other machine.

At operation 3300-A, Alice 3020 computes its public key according to the equation: A=g^a mod p. Alice 3020 communicates its public key A to Bob 3060.

Similarly, at operation 3300-B, Bob 3040 computes its public key according to the equation: B=g^b mod p. Bob 3040 communicates its public key A to Alice 3020.

At operation 3400-A, Alice 3020 computes a shared secret according to the equation: s=B^a mod p. At operation 3400-B, Bob 3040 computes the same shared secret s, but using a different equation: s=A^b mod p. The shared secret s is stored in the local memory of Alice 3020 and in the local memory of Bob 3040, in some implementations, in a secure part of the local memory. It should be noted that both Alice 3020 and Bob 3040 compute the same shared secret, using a combination of private and public values to reach the result.

As shown at blocks 3500-A, 3500-B, and 3500-S, after operations 3400-A and 3400-B, the value (g), the large prime (p), the public key (A) of Alice 3020, and the public key (B)

of Bob 3040 are public values known to Alice 3020, Bob 3040, and the server 3060. The private key (a) is a private value that is only known to Alice 3020. Similarly, the private key (b) is a private value that is only known to Bob 3040. The shared secret s is a private value that is known only to Alice 3020 and to Bob 3040, but not to the server 3060.

After implementing the method 3000, Alice 3020 and Bob 3040 may communicate with one another by encrypting messages with the shared secret s before transmission and decrypting messages with the shared secret s after transmission. The encrypted messages can be decrypted by Alice 3020 and by Bob 3040, but not by any eavesdroppers who may have access to the server 3060. Furthermore, by verifying that a message was encrypted with s, Alice 3020 can verify that the message was sent by Bob 3040, and Bob 3040 can verify that the message was sent by Alice 3020, since only Alice 3020 and Bob 3040 know the value of the shared secret s. In some implementations, the shared secret s is run through a key derivation function, and the output of the function is used to encrypt data.

According to one example implementation, at operation 3100-S, the server 3060 selects g=5 and p=23. (In most implementations, larger values of g or p may be used. However, small numbers are used here for simplicity of explanation.)

At operations 3200-A and 3200-B, the values a=6 and b=15 are selected.

Thus, at operations 3300-A and 3300-B, Alice 3020 computes A=g^a mod p=5^6 mod 23=8. Bob 3040 computes B=g^b mod p=5^15 mod 23=19.

At operations 3400-A and 3400-B, Alice 3020 computes the shared secret s=B^a mod p=19^6 mod 23=2. Bob 3040 computes, via a different equation, the shared secret s=A^b mod p=8^15 mod 23=2. It should be noted that both Alice 3020 and Bob 3040 arrive at the same shared secret s=2, using different inputs to compute the shared secret s.

Alice 3020 may periodically modify a value of the private key a, for example, after a passage of a predetermined time period or after sending a predetermined number of messages. Upon modifying the private key a, Alice 3020 re-computes its public key A based on the modified value of its private key a. Alice 3020 notifies Bob 3040 of the re-computed value of the public key A. Alice 3020 re-computes the shared secret s of Alice 3020 and Bob 3040 based on the modified value of the private key a. Upon receiving a notification, from Alice 3020, that the public key A of Alice 3020 has changed, Bob 3040 re-computes the shared secret s of Alice 3020 and Bob 3040 based on the modified value of the public key A.

Similarly, Bob 3040 may periodically modify a value of the private key b, for example, after a passage of a predetermined time period or after sending a predetermined number of messages. Upon modifying the private key b, Bob 3040 re-computes its public key B based on the modified value of its private key b. Bob 3040 notifies Alice 302 of the re-computed value of the public key B. Bob 3040 re-computes the shared secret s of Alice 3020 and Bob 3040 based on the modified value of the private key b. Upon receiving a notification, from Bob 3040, that the public key B of Bob 3040 has changed, Alice 3020 re-computes the shared secret s of Alice 3020 and Bob 3040 based on the modified value of the public key B.

According to some implementations, a first device may install an application (e.g., a messaging application or a web browser) on a device. Upon installation, the messaging application generates a long-term asymmetric signing key and N short-term asymmetric data encryption keys. In order to communicate with a second device (e.g., a web server or another user of the messaging application), the first device is to obtain the public encryption keys for the second device. In some examples, the public encryption keys are exchanged when accessing a webpage for the first time. In some examples, the public encryption keys are exchanged during the "add friend" procedure, which is implemented when the user of the first device and the user of the second device indicate that they wish to communicate with one another in the messaging application. The public keys are stored at a server or a data repository associated with the messaging application (e.g., server 3060) and are obtained by the first device and the second device, by accessing the server or the data repository over a network. In some implementations, the public encryption keys may be exchanged the first time the first device sends a message to the second device or the second device sends a message to the first device. When the first message is sent or when the "add friend" procedure is implemented, the public keys can be obtained from the communication server (e.g., server 3060) or from the communication partner (e.g., Alice 3020 can obtain the public key of Bob 3040 from Bob 3040). The public keys are stored either in a server or data repository associated with the messaging application or on the devices of the users having the public keys (e.g., the public key of the first device is stored on the first device). As noted above, devices may occasionally modify their public and private keys to increase security in the unlikely event that a key is accidentally compromised by "hacking" into the client device or by guessing the value of the key.

According to some implementations, the server verifies, by communicating with the device, that a message is successfully decrypted at the device. If the message is not successfully decrypted, the server checks whether the public key of the communication partner has changed and, if so, updates the public key provided to the client device. The server checks, by accessing the client device receiving the message, whether the public key of the device receiving the message has changed and, if so, updates the public key stored at the communication partner device and instructs the communication partner device to attempt re-encoding (e.g., re-wrapping) and re-transmission of the message using the new public key of the client device by transmitting an instruction over the network. According to some implementations, the user may be able to view when his/her conversations are encrypted. For example, text or an image associated with encryption may be presented in a corner of the screen.

According to some implementations, a recipient who is logged out of the messaging application may have no available key material. In this implementation, the sender of the message may be notified that the recipient is logged out. The sender may be offered to wait to send the message until the recipient logs in, when the key material can be obtained from the recipient for encrypting the message. In some implementations, the sender may be offered to send the message to the recipient without using encryption. In some implementations, when encryption is always required, an error message may be presented.

FIG. 3 describes one approach to encryption and decryption. However, in some implementations, different approaches to encryption and decryption can be used in place of the approach described in FIG. 3. For example, some implementations may use the Advanced Encryption Software (AES), Rivest-Shamir-Adleman algorithm (RSA), or Elliptic Curve Diffie Hellman (ECDH) algorithm for encryption and decryption.

Figure 4:
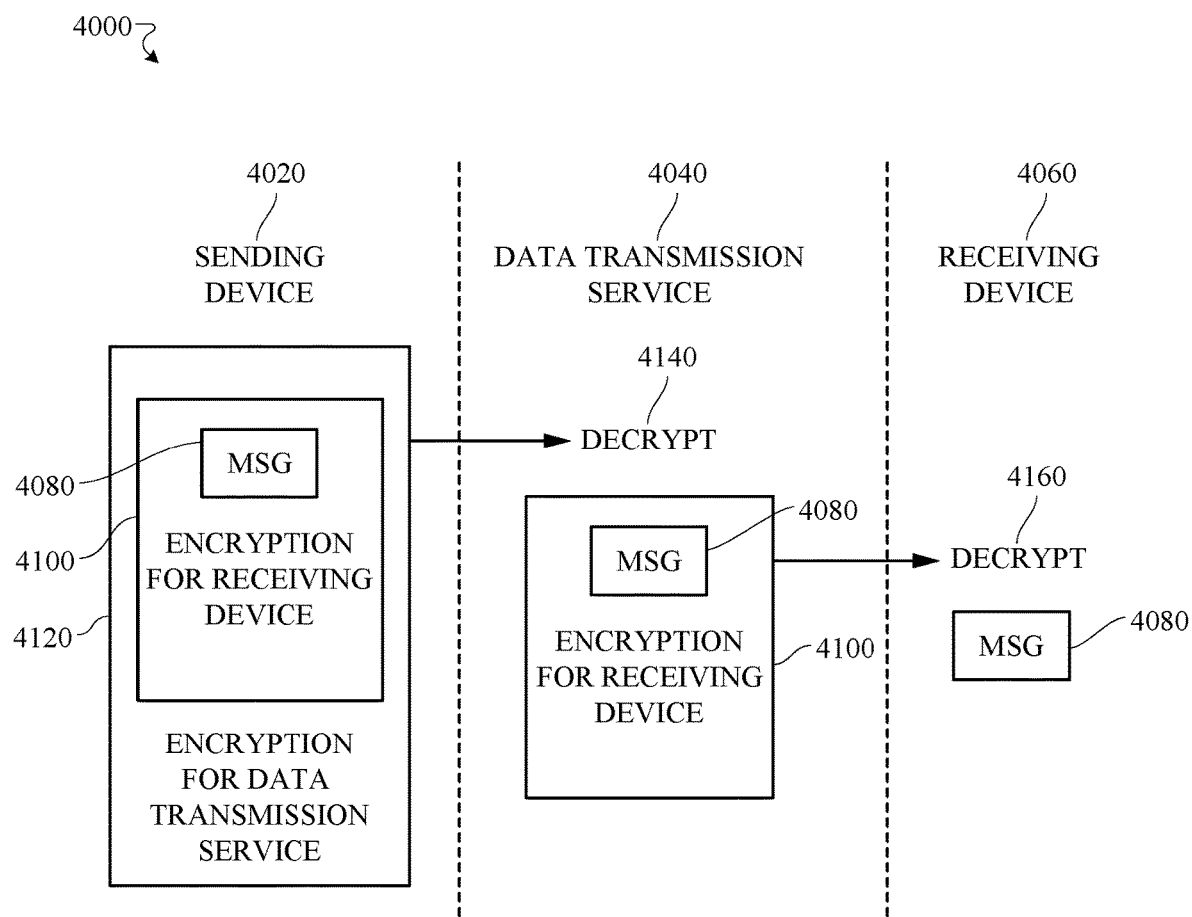
FIG. 4 is a flow diagram of an example of a method of distributed trust-based message transmission.

FIG. 4 is a data flow diagram of an example sequence of operations for distributed trust-based message transmission 4000. As shown, the distributed trust-based message transmission 4000 may be performed using a sending device 4020, a data transmission service 4040, and receiving device 4060. Each of the sending device 4020 or the receiving device 4060 may be a client or a server in a network system. Each of the sending device 4020 or the receiving device 4060 may correspond to the computing device 1000 of FIG. 1 and/or the computing and communications devices 2300, 2410, 2420, 2510, 2520, 2530 of FIG. 2. The data transmission service 4040 may be an ISP, a VPN, a web infrastructure service, or the like. The data transmission service 4040 may include at least one of the first network 2100, the access point 2200, the second network 2400, or the third network 2500.

As shown in FIG. 4, the sending device encrypts, for example, as shown in FIG. 3, an unencrypted message 4080 using encryption for the receiving device 4060, for example, encryption that the receiving device 4060 is capable of decrypting, to generate a first encrypted message 4100. The sending device 4020 then encrypts, for example, as shown in FIG. 3, the first encrypted message 4100, coupled with addressing data associated with the receiving device 4060, using encryption for the data transmissions service 4040, for example, encryption that the data transmission service 4040 is capable of decrypting, to generate a second encrypted message 4120. The addressing data may include an IP address or an address in another protocol.

The sending device 4020 transmits the second encrypted message 4120 via the data transmission service 4040. Upon receipt of the second encrypted message 4120, the data transmission service 4040 decrypts 4140 the second encrypted message 4120 into the first encrypted message 4120 and the addressing data of the receiving device 4060. The data transmission service 4040 transmits the first encrypted message to the receiving device 4060, for example, based on the addressing data. Upon receipt of the first encrypted message 4100, the receiving device 4060 decrypts 4160 the first encrypted message 4100 to read the unencrypted message 4080.

The receiving device 4060 may transmit a response to the unencrypted message 4080 using the technique described herein. For the transmission of the response, the receiving device 4060 would act as the sending device 4020, and vice versa.

Figure 5:
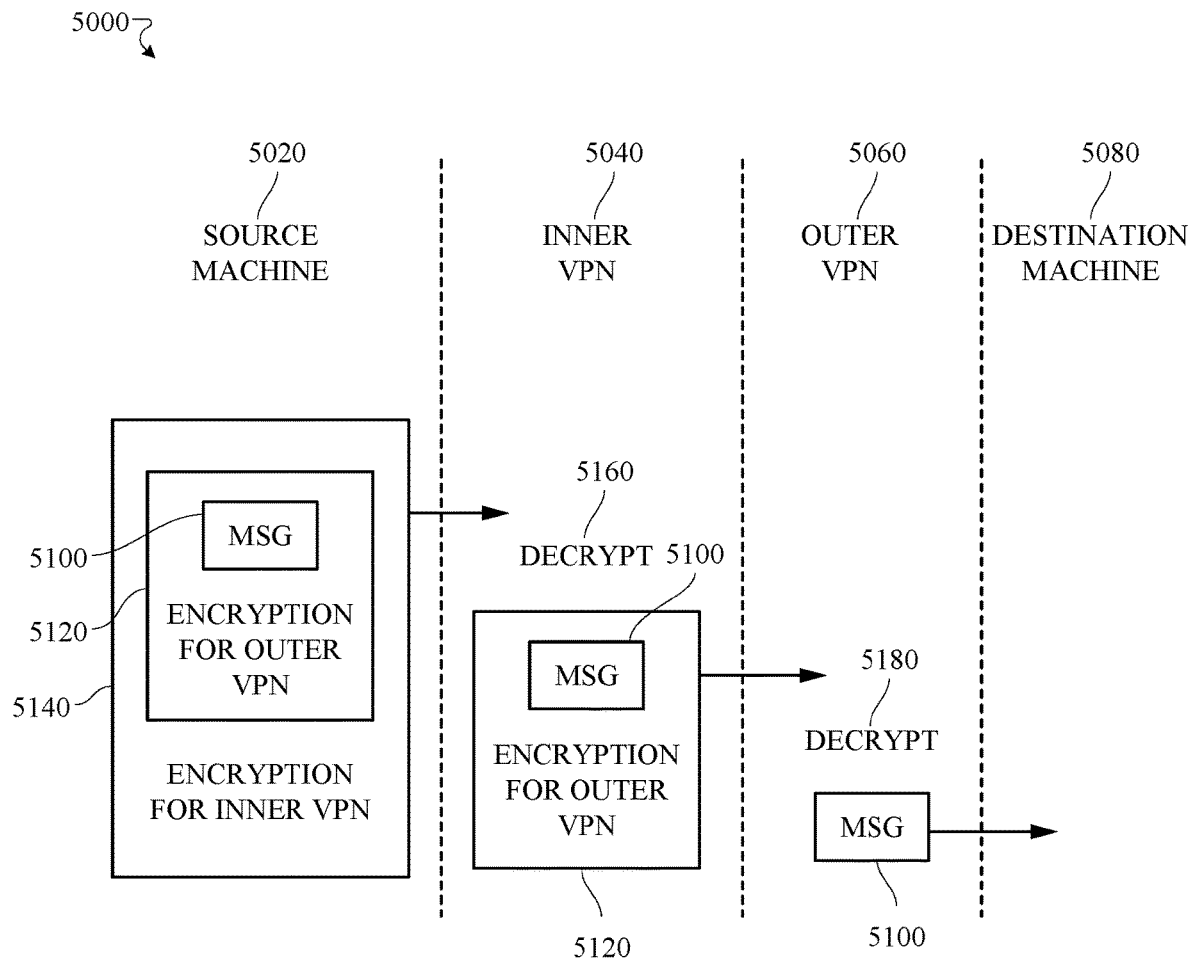
FIG. 5 is a flow diagram of an example of a method of distributed trust-based message transmission over multiple virtual private networks.

FIG. 5 is a data flow diagram of an example sequence of operations for distributed trust-based message transmission 5000 over multiple VPNs. As shown, the distributed trust-based message transmission 5000 may be performed using a source machine 5020, an inner VPN 5040, an outer VPN 5060, and a destination machine 5080. Each of the source machine 4020 or the destination machine 4060 may correspond to the computing device 1000 of FIG. 1 and/or the computing and communications devices 2300, 2410, 2420, 2510, 2520, 2530 of FIG. 2. Each of the inner VPN 5040 or the outer VPN 5060 may include at least one of the first network 2100, the second network 2400, or the third network 2500.

The source machine 5020 may leverage multiple VPN technology (e.g., double VPN technology as shown, however, in some implementations, more than two VPNs can be used). As shown, to transmit messages over the Internet or other networks (e.g., to the destination machine 5080 as shown), the source machine 5020 first transmits its messages to the inner VPN 5040. The inner VPN 5040 forwards the messages to the outer VPN 5060. The outer VPN 5060 then communicates with the Internet or the other networks.

As a result of the double VPN embodiment, the privacy of the user of the source machine 5020 is increased because the inner VPN 5040 knows the identity of the source machine 5020 but forwards the communications of the source machine 5020 to the outer VPN 5060 instead of processing the communications itself. The outer VPN 5060 is not aware of the identity of the source machine 5020, as the outer VPN 5060 communicates with the inner VPN 5040 and not with the source machine 5020. The inner VPN 5040 forwards responses from the outer VPN 5060 to the source machine 5020.

As illustrated, the source machine 5020 accesses an input message 5100 for transmission to the destination machine 5080. The input message 5100 may include an unencrypted message to be read by the destination machine 5080 and addressing data, such as an IP address or an address in another protocol, of the destination machine 5080. The source machine 5020 generates a first encrypted message 5120 by encrypting, for example, using the technique shown in FIG. 3, the input message 5080 for transmission by the outer VPN 5060. The source machine 5020 then encrypts, for example, using the technique shown in FIG. 3, the first encrypted message 5120 coupled with addressing data associated with the outer VPN 5060, such as an IP address or other address of a server of the outer VPN 5060, for decryption by the inner VPN 5040, to generate a second encrypted message 5140. The source machine 5020 transmits the second encrypted message 5140 to the inner VPN 5040.

After receiving the second encrypted message 5140, the inner VPN 5040 decrypts 5160 the second encrypted message 5140 to yield the first encrypted message 5120 and the addressing data associated with the outer VPN 5060. The inner VPN 5040 transmits the first encrypted message 5120 to the outer VPN 5060.

After receiving the first encrypted message 5120, the outer VPN 5060 decrypts 5080 the first encrypted message 5120 to yield the input message 5100. The outer VPN 5060 transmits the input message 5100 to the destination machine 5080.

The destination machine 5080 may generate a response to the input message 5100 and provide the response to the outer VPN 5060. The outer VPN 5060 may provide the response to the inner VPN 5040 in conjunction with an indicator of the transmission from the inner VPN 5040 that prompted the response. The inner VPN 5040 identifies the source machine 5020 based on the indicator of the transmission and forwards the response to the source machine 5020. In some implementations, the destination machine 5080 may transmit the response to the source machine 5020 using the technique shown in FIG. 5, with the destination machine 5080 functioning as the source machine 5020, the outer VPN 5060 functioning as the inner VPN 5040, and vice versa.

Users of computing devices may communicate with one another over instant messaging services, which allow the users of devices to share text messages, images, audio recordings, videos, files, and the like. Some messaging services provide end-to-end encryption ensuring that a message securely travels from an originator device to a source device without being intercepted by eavesdroppers or malicious actors. However, different users typically prefer different instant messaging services by different developers. Providing distributed trust-based communications between different messaging services may be desirable.

Figure 6:
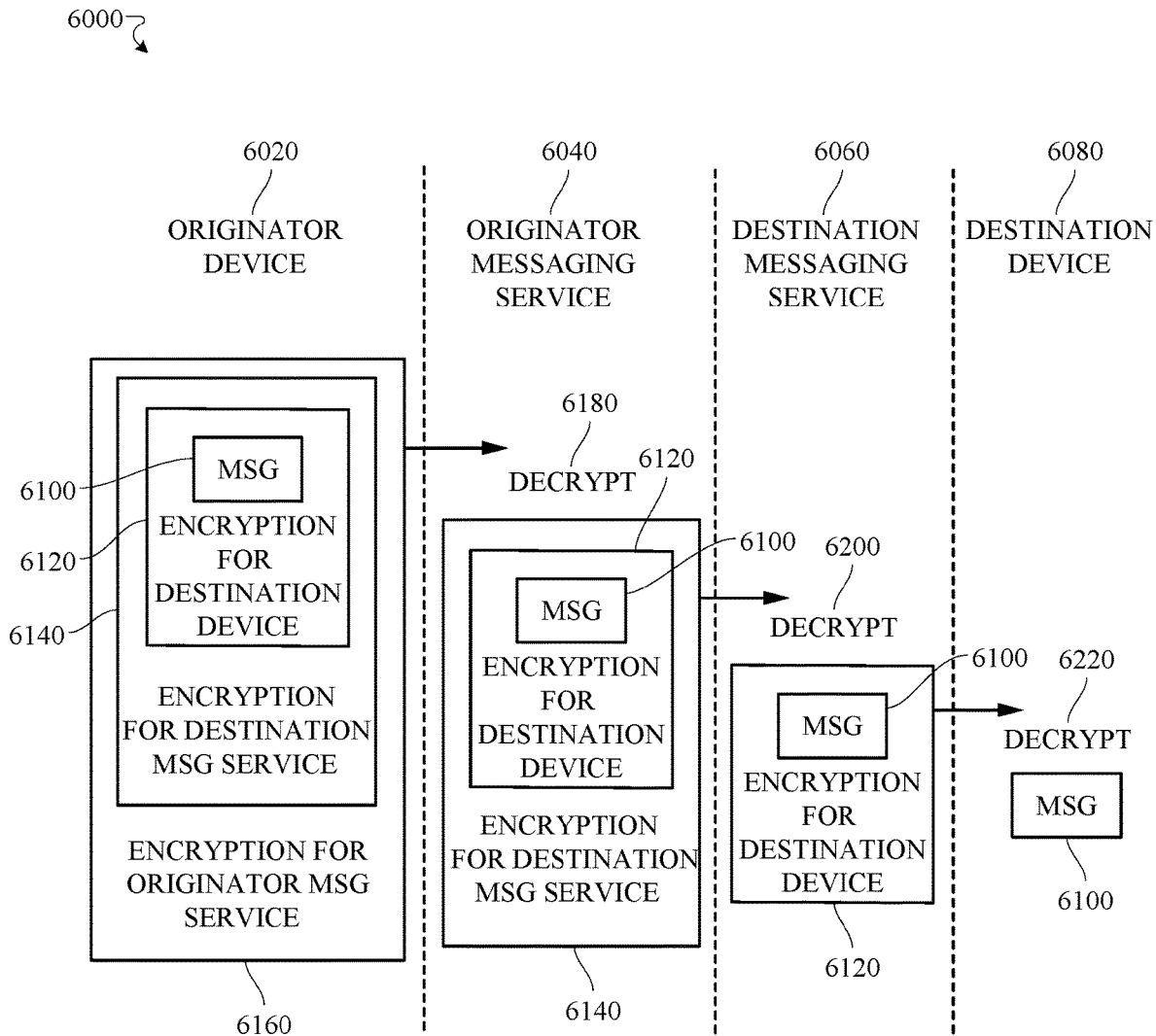
FIG. 6 is a flow diagram of an example of a method of distributed trust-based message transmission over multiple messaging services.

FIG. 6 is a data flow diagram of an example sequence of operations for distributed trust-based message transmission 6000 over multiple messaging services. As shown in FIG. 6, an originator device 6020 uses an originator messaging service 6040, and a destination messaging service 6060 is used at a destination device 6080. A user of the originator device 6020 may wish to send a distributed trust-based message to a user of the destination device 6080. However, as the originator messaging service 6040 is different from the destination messaging service 6060, this may be challenging. The distributed trust-based message transmission 6000 provides a solution to these challenges. Each of the originator device 6020, the originator messaging service 6040, the destination messaging service 6060 or the destination device 6080 may correspond to the computing device 1000 of FIG. 1 and/or the computing and communications devices 2300, 2410, 2420, 2510, 2520, 2530 of FIG. 2.

As shown in FIG. 6, the user of the originator device 6020 creates, for example, within an application associated with the originator messaging service 6040, an unencrypted message 6100 for transmission to the destination device 6080. The originator device 6020 encrypts the unencrypted message for decryption at the destination device 6080 to generate a destination device-decryptable message 6120. For example, the destination device-decryptable message 6120 may be encrypted with a public key or other public data of the destination device 6080 and a private key or other private data of the originator device 6020, as described in conjunction with FIG. 3.

The originator device 6020 encrypts a combination of the destination-device decryptable message 6120 and the addressing data of the destination device 6080, such as a user identifier associated with the destination device 6080 in the destination messaging service 6060, for decryption at the destination messaging service 6060 to generate a first encrypted message 6140. The first encrypted message 6140 may be encrypted with a public key or other public data of the destination messaging service 6060. For example, the encryption technique shown in FIG. 3 may be used.

The originator device 6020 encrypts a combination of the first encrypted message 6140 and the addressing data of the destination messaging service 6060, such as an IP address of a server of the originator messaging service 6040, for decryption at the originator messaging service 6040 to generate a second encrypted message 6160. The second encrypted message 6160 may be encrypted with a public key or other public data of the originator messaging service 6040. For example, the encryption technique shown in FIG. 3 may be used.

The originator device 6020 transmits the second encrypted message 6160 via the originator messaging service 6040. After receiving the second encrypted message 6160, the originator messaging service 6040 decrypts 6180 the second encrypted message 6160 to access the first encrypted message 6140 and the addressing data of the destination messaging service 6060.

The originator messaging service 6040 transmits the first encrypted message 6140 to the destination messaging service 6060. After receiving the first encrypted message 6140, the destination messaging service 6060 decrypts 6200 the second encrypted message 6140 to access the destination-device decryptable message 6120 and the addressing data of the destination device 6080.

The destination messaging service 6060 transmits the destination-device decryptable message 6120 to the destination device 6080. After receiving the destination device-decryptable message 6120, the destination device 6080 decrypts 6220 the destination device-decryptable message 6120 to access the unencrypted message 6100. The destination device 6080 may display the unencrypted message 6100 within an application associated with the destination messaging service 6060.

The user of the destination device 6080 may compose a response to the unencrypted message 6100 for transmission to the originator device 6020. To transmit the response, the technique described herein may be used, with the destination device 6080 acting as the originator device 6020, the destination messaging service 6060 acting as the originator messaging service 6040, and vice versa.

Figure 7:
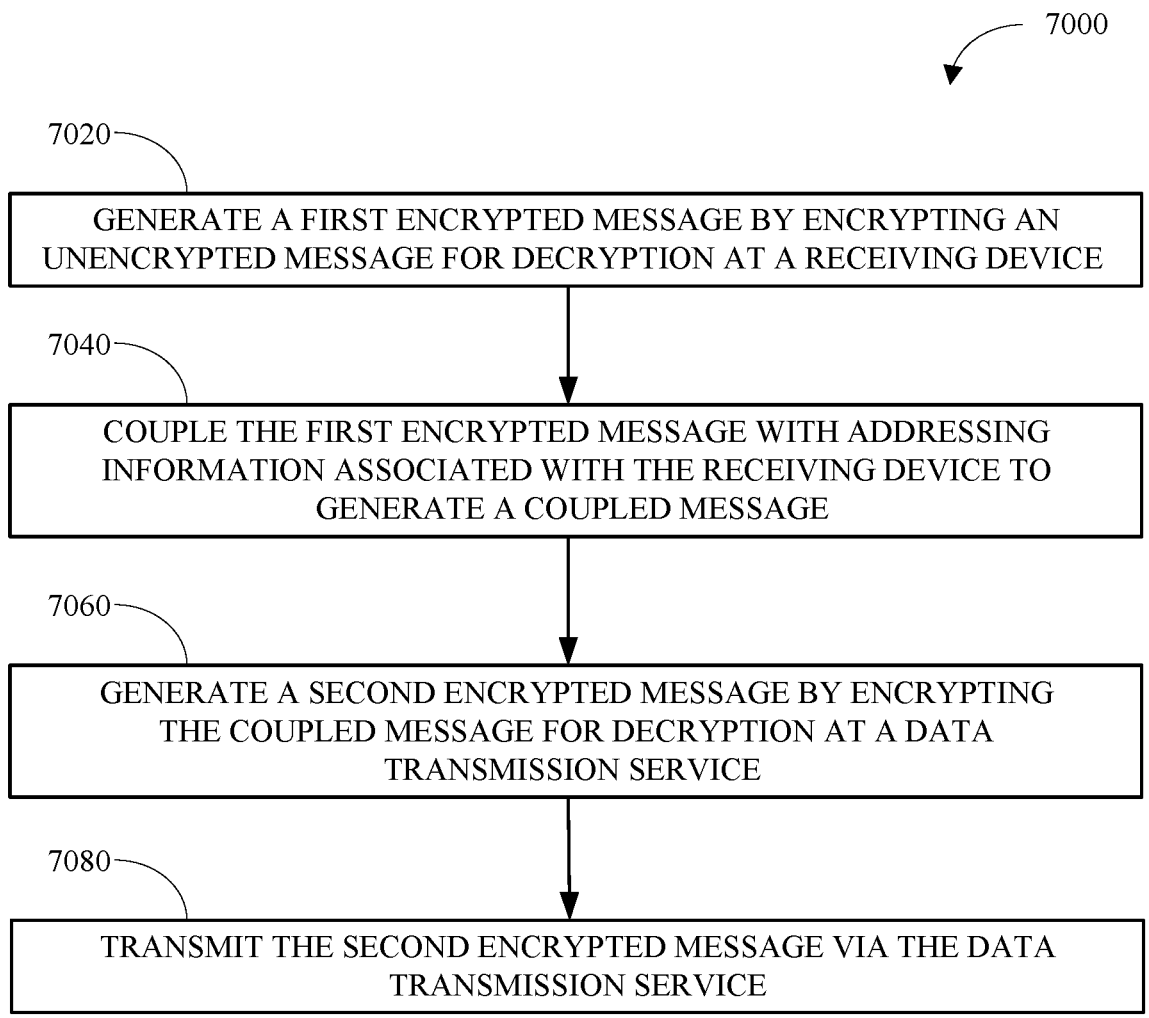
FIG. 7 is a flowchart of an example of a method of distributed trust-based message transmission.

FIG. 7 is a flowchart of an example of a technique for distributed trust-based message transmission 7000. The distributed trust-based message transmission 7000 may be implemented by a sending device, for example, the sending device 4020, connected with a receiving device, for example, the receiving device 4060, over a data transmission service, for example, the data transmission service 4040.

At block 7020, the sending device generates a first encrypted message by encrypting an unencrypted message for decryption at the receiving device. For example, the encryption technique of FIG. 3 or another encryption technique may be used. The unencrypted message may include data to be communicated to the receiving device. For example, if the sending device is a client device and the receiving device is a search engine web server, the unencrypted message may include a search query. In some implementations, the sending device generates the first encrypted message by encrypting the unencrypted message with a public key or other public data of the receiving device.

At block 7040, the sending device couples the first encrypted message with addressing data associated with the receiving device to generate a coupled message. The addressing data may be an IP address of the receiving device or an address in another protocol. The coupled message may be used to inform the machine(s) accessing the coupled message that the first encrypted message is to be delivered to an address corresponding to the addressing data.

At block 7060, the sending device generates a second encrypted message by encrypting the coupled message for decryption at the data transmission service. In some implementations, the sending device generates the second encrypted message by encrypting the coupled message with a public key or other public data of the data transmission service. For example, the encryption technique shown in FIG. 3 or another encryption technique may be used.

At block 7080, the sending device transmits the second encrypted message via the data transmission service to enable the receiving device to read the unencrypted message. After receiving the second message, the data transmission service decrypts the second encrypted message to access the coupled message, which includes the first encrypted message and the addressing data of the receiving device. The data transmission service forwards the first encrypted message, which is included in the coupled message, to the receiving device.

After receiving the first encrypted message, the receiving device decrypts the first encrypted message to read the unencrypted message. The receiving device may transmit a response to the unencrypted message using the technique described herein. For the transmission of the response, the receiving device would act as the sending device, and vice versa.

According to some implementations, the receiving device is a web server, the data transmission service is a web infrastructure service, and the sending device is a client device. According to some implementations, the first encrypted message and the second encrypted message are encrypted with a private key or other private data of the sending device.

Figure 8:
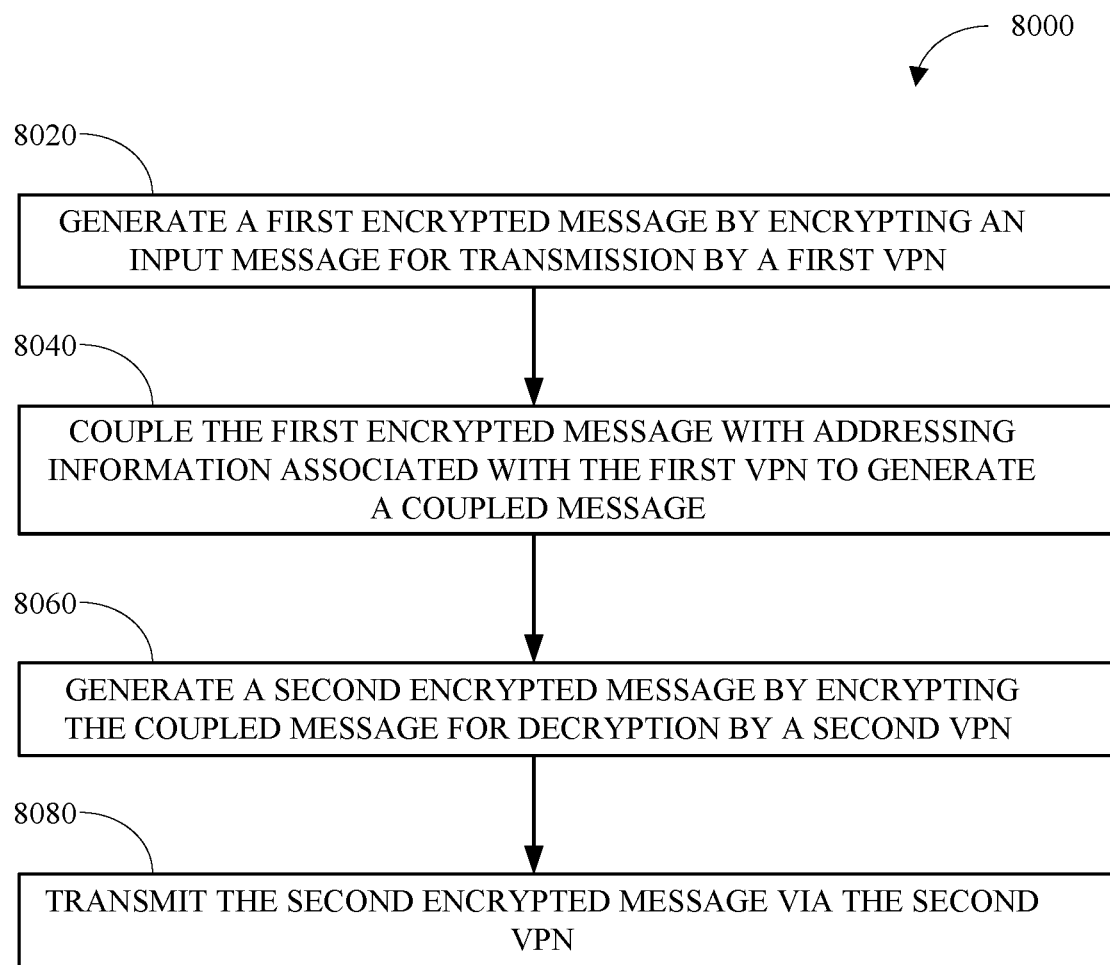
FIG. 8 is a flowchart of an example of a method of distributed trust-based message transmission over multiple VPNs.

FIG. 8 is a flowchart of an example of a technique for distributed trust-based message transmission 8000 over multiple VPNs. The distributed trust-based message transmission 8000 may be implemented at a source machine, such as the source machine 5020, that transmits an input message to a destination machine, such as the destination machine 5080, over two or more VPNs.

At block 8020, the source machine generates a first encrypted message, such as the first encrypted message 5120, by encrypting an input message, such as the input message 5100, for transmission by a first VPN, such as the outer VPN 506. The source machine may generate the first encrypted message by encrypting the input message with a public key or other public data of the first VPN. The encryption technique described in conjunction with FIG. 3 may be used. The first encrypted message may be encrypted for transmission, by the first VPN, to the destination machine via an Internet Protocol or other network-based transmission protocol.

At block 8040, the source machine couples the first encrypted message with addressing data associated with the first VPN to generate a coupled message. The addressing data may include an IP address or an address in another protocol. The coupled message might not include any identifying data of the source machine.

At block 8060, the source machine generates a second encrypted message, such as the second encrypted message 5140, by encrypting the coupled message for decryption by a second VPN, such as the inner VPN 504. The source machine may generate the second encrypted message by encrypting the coupled message with a public key or other public data of the first VPN and the private key or other private data of the source machine. The encryption technique described in conjunction with FIG. 3 may be used.

At block 8080, the source machine transmits the second encrypted message via the second VPN to enable transmission of the input message to the destination machine by the first VPN. After receiving the second encrypted message at the second VPN, the second VPN may decrypt the second encrypted message to access the coupled message, which includes the first encrypted message. The second VPN may forward the first encrypted message, in conjunction with an identifier of a communication session for processing response(s) to the first encrypted message, to the first VPN. In some implementations, the first VPN is not notified of an identity or an address of the source machine that generated the first encrypted message.

After receiving the first encrypted message at the first VPN, the first VPN may decrypt the first encrypted message to access the input message. The first VPN may transmit the first input message to the destination machine. The transmission from the first VPN to the destination machine may be over the Internet, other public network(s) or other private network(s).

In some implementations, the first VPN receives, from the destination machine, a response message in response to the input message. The first VPN provides the response message to the second VPN in conjunction with the identifier of a communication session. Based on the identifier of the communication session, the second VPN identifies the source machine (the identity of which may, in some implementations, be unknown to the second VPN). The second VPN forwards the response to the source machine.

Figure 9:
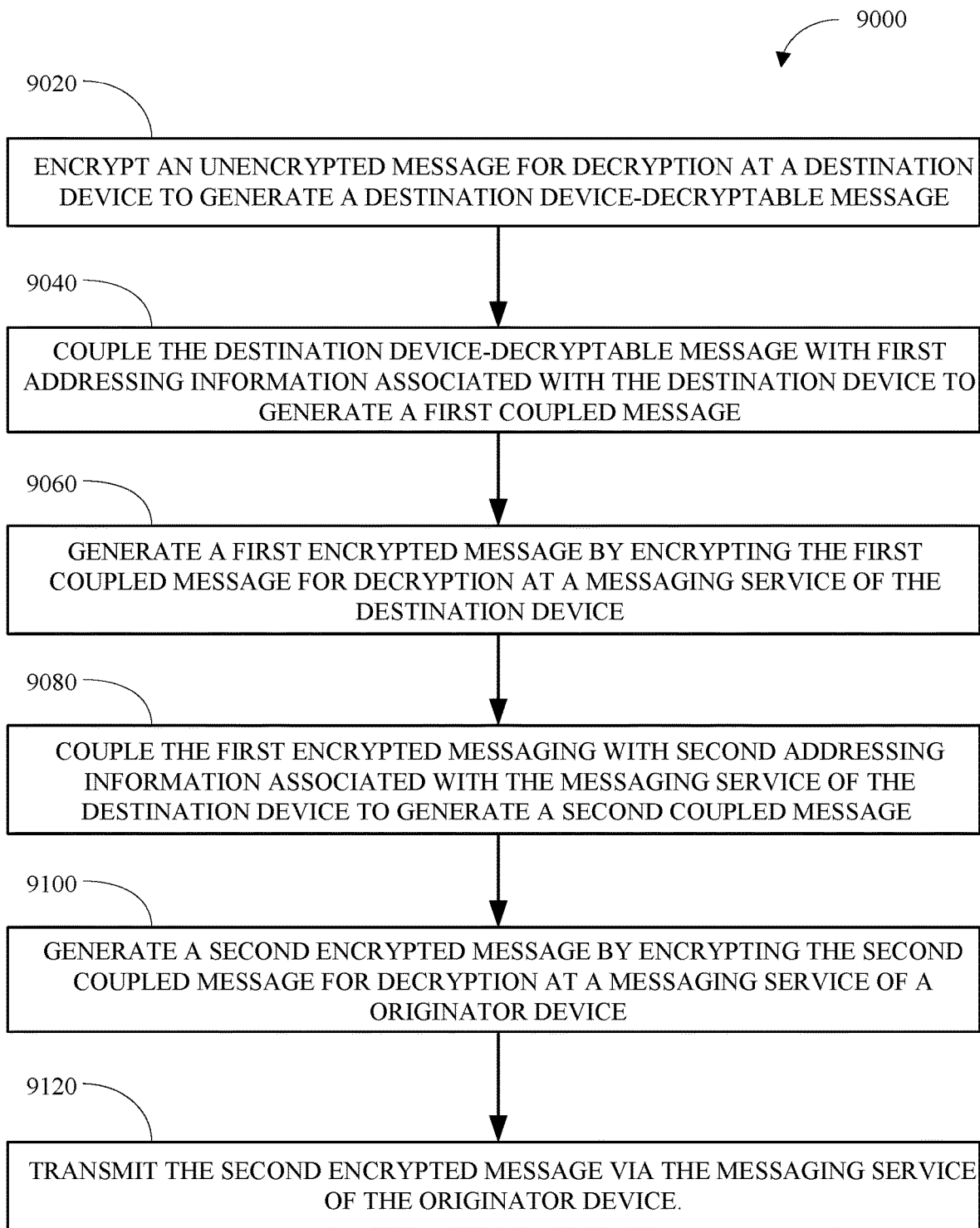
FIG. 9 is a flowchart of an example of a method of distributed trust-based message transmission over multiple messaging services.

FIG. 9 is a flowchart of an example of a technique for distributed trust-based message transmission 9000 over multiple messaging services. The distributed trust-based message transmission 9000 may be implemented at an originator device, such as the originator device 6020.

At block 9020, the originator device encrypts a unencrypted message, such as the unencrypted message 6100, for decryption at a destination device, such as the destination device 6080, to generate a destination device-decryptable message, such as the destination device-decryptable message 6120. In some implementations, the originator device accesses the unencrypted message from user input into an application associated with the messaging service, such as the originator messaging service 6040, of the originator device executing at the originator device. The unencrypted message may be encrypted using the technique illustrated in FIG. 3. The unencrypted message may be encrypted based on a public key or other public data of the destination device and a private key or other private data of the originator device.

At block 9040, the originator device couples the destination device-decryptable message with first addressing data associated with the destination device to generate a first coupled message. The first addressing data may include an IP address of the destination device, an address of the destination device in another protocol, or an indicator of the messaging service of the destination device and a user identifier within that messaging service associated with the destination device.

At block 9060, the originator device generates a first encrypted message, such as the first encrypted message 6140, by encrypting the first coupled message for decryption at a messaging service, such as the destination messaging service 606, of the destination device. The first coupled message may be encrypted using the technique illustrated in FIG. 3. The first coupled message may be encrypted based on a public key or other public data of the messaging service of the destination device and a private key or other private data of the originator device.

At block 9080, the originator device couples the first encrypted messaging with second addressing data associated with the messaging service of the destination device to generate a second coupled message. The second addressing data may include an IP address of the messaging service of the destination device or an address of the messaging service of the destination device in another protocol. In some implementations, data associated with the IP or other protocol address, for example, data that can be used to look up the IP address in a domain name system (DNS) service, may be used.

At block 9100, the originator device generates a second encrypted message, such as the second encrypted message 6160, by encrypting the second coupled message for decryption at the messaging service of the originator device. The second coupled message may be encrypted using the technique illustrated in FIG. 3. The first coupled message may be encrypted based on a public key or other public data of the messaging service of the originator device and a private key or other private data of the originator device.

At block 9120, the originator device transmits the second encrypted message via the messaging service of the originator device. This transmission enables the destination device to read the unencrypted message using the messaging service of the destination device. After receiving the second encrypted message, the messaging service of the originator device decrypts the second encrypted message to access the second coupled message. The messaging service of the originator device forwards the first encrypted message, from within the second coupled message, to the messaging service of the destination device.

After receiving the first encrypted message, the messaging service of the destination device decrypts the first encrypted message to access the first coupled message. The messaging service of the destination device forwards the destination device-decryptable message, from within the first coupled message, to the destination device. After receiving the destination device-decryptable message, the destination device decrypts the destination device-decryptable message to access the unencrypted message. The destination device displays the unencrypted message via an application associated with the messaging service of the destination device.

Unless expressly stated, or otherwise clear from context, the terminology "computer," and variations or wordforms thereof, such as "computing device." "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure." indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify." and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    generating a first encrypted message by encrypting an input message for transmission by a first virtual private network (VPN);

coupling the first encrypted message with addressing information associated with the first VPN to generate a coupled message;
generating a second encrypted message by encrypting the coupled message for decryption by a second VPN; and
transmitting the second encrypted message via the second VPN to enable transmission of the input message to a destination machine by the first VPN, wherein transmitting the second encrypted message via the second VPN causes the second VPN to perform first operations comprising:
   decrypting the second encrypted message to access the coupled message; and
   forwarding the first encrypted message, from within the coupled message, to the first VPN, wherein forwarding the first encrypted message to the first VPN causes the first VPN to perform second operations comprising:
      decrypting the first encrypted message to access the input message; and
      transmitting the input message to the destination machine.

2. The method of claim 1, wherein generating the first encrypted message comprises:
   encrypting the input message with public data of the first VPN.

3. The method of claim 1, wherein generating the second encrypted message comprises:
   encrypting the coupled message with public data of the second VPN.

4. The method of claim 1, wherein forwarding the first encrypted message to the first VPN further causes the first VPN to perform operations comprising:
   receiving a response message in response to the input message; and
   providing the response message to the second VPN for provisioning to a computing machine that generated the first encrypted message via the second VPN.

5. The method of claim 1, wherein the first VPN is not notified of an identity of a computing machine that generated the first encrypted message by the second VPN.

6. The method of claim 1, wherein generating the first encrypted message by encrypting the input message for transmission by the first VPN comprises:
   generating the first encrypted message by encrypting the input message for transmission via an Internet Protocol by the first VPN.

7. The method of claim 1, wherein the first encrypted message or the second encrypted message is encrypted using at least one of: Diffie Hellman Encryption, Elliptic Curve Diffie Hellman (ECDH) encryption, Advanced Encryption Software (AES), or Rivest-Shamir-Adleman (RSA) Encryption.

8. A system comprising:
   non-transitory memory storing instructions; and
   one or more processors that executes the instructions to:
      generate a first encrypted message by encrypting an input message for transmission by a first virtual private network (VPN);
      couple the first encrypted message with addressing information associated with the first VPN to generate a coupled message;
      generate a second encrypted message by encrypting the coupled message for decryption by a second VPN; and
      transmit the second encrypted message via the second VPN to enable transmission of the input message to a destination machine by the first VPN, wherein transmitting the second encrypted message via the second VPN causes the second VPN to perform first operations comprising:
         decrypting the second encrypted message to access the coupled message; and
         forwarding the first encrypted message, from within the coupled message, to the first VPN, wherein forwarding the first encrypted message to the first VPN causes the first VPN to perform second operations comprising:
            decrypting the first encrypted message to access the input message; and
            transmitting the input message to the destination machine.

9. The system of claim 8, wherein generating the first encrypted message comprises:
   encrypting the input message with public data of the first VPN.

10. The system of claim 8, wherein generating the second encrypted message comprises:
   encrypting the coupled message with public data of the second VPN.

11. The system of claim 8, wherein forwarding the first encrypted message to the first VPN further causes the first VPN to perform operations comprising:
   receiving a response message in response to the input message; and
   providing the response message to the second VPN for provisioning to a computing machine that generated the first encrypted message via the second VPN.

12. The system of claim 8, wherein the first VPN is not notified of an identity of a computing machine that generated the first encrypted message by the second VPN.

13. The system of claim 8, wherein generating the first encrypted message by encrypting the input message for transmission by the first VPN comprises:
   generating the first encrypted message by encrypting the input message for transmission via an Internet Protocol by the first VPN.

14. The system of claim 8, wherein the first encrypted message or the second encrypted message is encrypted using at least one of: Diffie Hellman Encryption, Elliptic Curve Diffie Hellman (ECDH) encryption, Advanced Encryption Software (AES), or Rivest-Shamir-Adleman (RSA) Encryption.

15. At least one non-transitory computer readable medium storing instructions that, when executed by at least one computer, cause the at least one computer to:
   generate a first encrypted message by encrypting an input message for transmission by a first virtual private network (VPN);
   couple the first encrypted message with addressing information associated with the first VPN to generate a coupled message;
   generate a second encrypted message by encrypting the coupled message for decryption by a second VPN; and
   transmit the second encrypted message via the second VPN to enable transmission of the input message to a destination machine by the first VPN, wherein transmitting the second encrypted message via the second VPN causes the second VPN to perform first operations comprising:
      decrypting the second encrypted message to access the coupled message; and
      forwarding the first encrypted message, from within the coupled message, to the first VPN, wherein forwarding the first encrypted message to the first VPN causes the first VPN to perform second operations comprising:
   decrypting the first encrypted message to access the input message; and
   transmitting the input message to the destination machine.

16. The at least one computer readable medium of claim 15, wherein generating the first encrypted message comprises:
   encrypting the input message with public data of the first VPN.

* * * * *